US008688093B2

(12) United States Patent
Bloebaum et al.

(10) Patent No.: US 8,688,093 B2
(45) Date of Patent: Apr. 1, 2014

(54) DEVICE AND METHOD FOR PRESERVING CUSTOMIZED USER SETTINGS WHEN TRANSITIONING BETWEEN MOBILE COMMUNICATION DEVICES

(75) Inventors: L. Scott Bloebaum, Cary, NC (US); Ivan Nelson Wakefield, Cary, NC (US)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1534 days.

(21) Appl. No.: 11/900,694

(22) Filed: Sep. 13, 2007

(65) Prior Publication Data
US 2009/0075639 A1     Mar. 19, 2009

(51) Int. Cl.
| | |
|---|---|
| *H04M 3/00* | (2006.01) |
| *H04B 1/38* | (2006.01) |
| *H04W 24/00* | (2009.01) |
| *H04W 4/00* | (2009.01) |
| *H04J 3/18* | (2006.01) |

(52) U.S. Cl.
USPC ........... 455/418; 455/558; 455/425; 455/419; 455/466; 370/477

(58) Field of Classification Search
USPC .......................................................... 455/418
See application file for complete search history.

(56) References Cited

U.S. PATENT DOCUMENTS

| | | | | |
|---|---|---|---|---|
| 2002/0169004 | A1* | 11/2002 | Thil et al. ....................... | 455/558 |
| 2003/0119552 | A1* | 6/2003 | Laumen et al. ................ | 455/557 |
| 2003/0186723 | A1* | 10/2003 | Kim .............................. | 455/558 |
| 2003/0224823 | A1* | 12/2003 | Hurst et al. .................... | 455/558 |
| 2004/0209651 | A1* | 10/2004 | Tsukamoto .................... | 455/558 |
| 2005/0059385 | A1 | 3/2005 | Twigg | |
| 2006/0199613 | A1* | 9/2006 | Almgren ........................ | 455/558 |
| 2007/0016682 | A1* | 1/2007 | Hodgson ........................ | 709/228 |
| 2007/0076760 | A1* | 4/2007 | Wennberg et al. ............. | 370/477 |
| 2007/0111726 | A1 | 5/2007 | Lamber | |
| 2008/0009318 | A1* | 1/2008 | Evans ........................... | 455/558 |
| 2008/0081609 | A1* | 4/2008 | Burgan et al. ................. | 455/425 |
| 2008/0147685 | A1* | 6/2008 | Mock et al. .................... | 707/100 |

FOREIGN PATENT DOCUMENTS

EP            1349406 A       10/2003

* cited by examiner

*Primary Examiner* — Timothy Pham

(74) *Attorney, Agent, or Firm* — Patrick B. Horne; Moore & Van Allen PLLC

(57) ABSTRACT

There is disclosed a system, method, and computer readable medium for applying customized settings to a mobile communications device utilizing a removable storage media. The mobile communications device detects when a removable storage media has been operatively inserted. Next it is determined whether there is a customized settings file stored on the removable storage media. The customized settings file contains fields that define one or more characteristics relating to the mobile communications device's configuration. The customized settings in the customized settings file are then applied such that the mobile communications device is configured with the specific settings contained in the customized settings file. The customized settings file may also be stored at and retrieved from a remote location or received in a message using a mobile messaging service utilizing the RF module within the mobile communications device.

10 Claims, 5 Drawing Sheets

DEVICE AND METHOD FOR PRESERVING CUSTOMIZED USER SETTINGS WHEN TRANSITIONING BETWEEN MOBILE COMMUNICATION DEVICES

BACKGROUND OF THE INVENTION

Mobile phone users often invest considerable time in inputting and adjusting numerous mobile phone settings to create an enhanced user experience. Items such as ringtones, speed dial settings, contacts, wallpaper settings, call logs, etc. have been meticulously set by the user to customize the mobile phone to a great extent.

Many mobile phone users periodically update their equipment as newer technologies emerge. When such an equipment change takes place, a significant burden is placed on the user to program the new mobile phone with the customized settings in use on the mobile phone to be replaced. This can be quite irritating and frustrating to the user.

What is needed is a system and/or method by which a user can change equipment and the new mobile phone can recognize and implement customized settings from the mobile phone being replaced.

BRIEF SUMMARY OF THE INVENTION

In one embodiment there is disclosed a system, method, and computer readable medium for applying customized settings to a mobile communications device utilizing a removable storage media. The mobile communications device detects when a removable storage media has been operatively inserted. Next it is determined whether there is a customized settings file stored on the removable storage media. The customized settings file contains fields that define one or more characteristics relating to the mobile communications device's configuration. The customized settings in the customized settings file are then applied such that the mobile communications device is configured with the specific settings contained in the customized settings file.

Another embodiment addresses a situation in which the customized settings file is stored at a remote location. In this embodiment the mobile communications device uses its RF module to locate and retrieve the customized settings file before applying it to change the settings and configuration of the mobile communications device.

In still another embodiment, the mobile communications device can receive the customized settings file using a mobile messaging service. Once the message is received, the customized settings file is retrieved from the message and can then be applied such that the mobile communications device is configured with the specific settings contained in the customized settings file.

The customized settings file can include one or more of a ringtone setting, a ringtone volume setting, individual contact ringtone settings, individual contact picture settings, speed dial settings, a theme setting, a wallpaper display setting, a background display setting, call log settings, and a setting that determines whether contact information entered or modified in the device are automatically saved to the SIM (hereinafter "autosave to SIM setting").

In addition, the removable storage media can be a SIM card or a removable memory device. The customized settings file can also be storable in a manner that emulates a contact, either hidden from or visible to the user, within a contacts database that is storable on a SIM card.

In the embodiment in which the customized settings file can be received by the mobile communications device using a mobile messaging service, the mobile messaging service can be a short messaging service (SMS), a multi-media messaging service (MMS), an e-mail messaging service, or other suitable method.

DETAILED DESCRIPTION OF THE INVENTION

Figure 1:
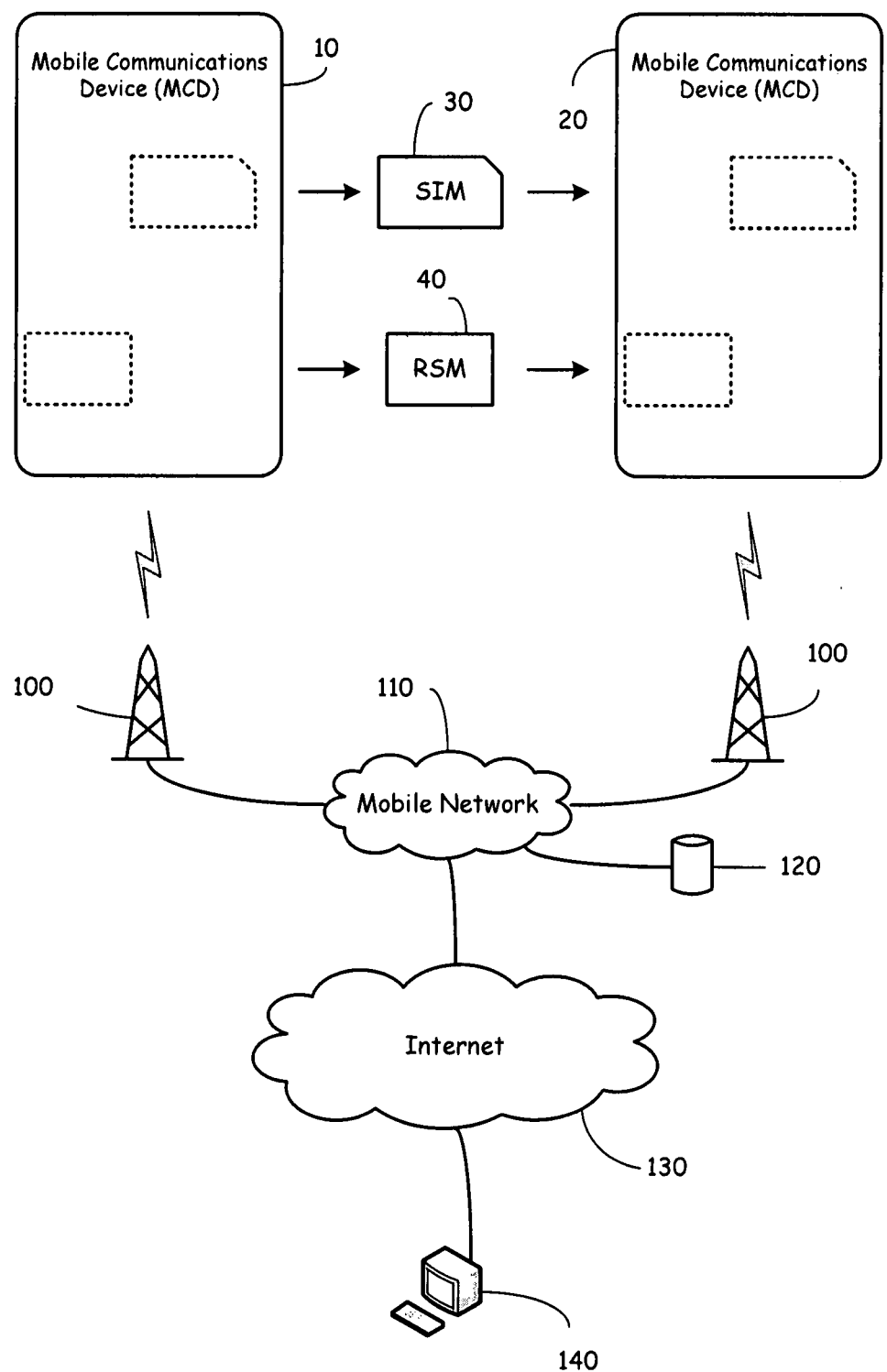
FIG. 1 shows local and network components that can be utilized when a user switches from one mobile communications device to another mobile communications device.

FIG. 1 shows local and network components that can be utilized when a user switches from one mobile communications device 10 to another mobile communications device 20. Sometimes a mobile phone user desires to change or upgrade their equipment from a first mobile communications device 10 to a second mobile communications device 20. Doing so, however, puts the user back at square one with respect to personalizing or customizing the new mobile communications device 20 with settings that were already implemented on the old mobile communications device 10.

Embodiments of the present invention will describe methods and systems that will allow the user to maintain customized or personalized settings in the new mobile communications device 20 that were already in place on the old mobile communications device 10. As will be discussed in further detail, the methods and systems may utilize a SIM card 30, a removable storage media 40, mobile messaging services such as SMS, MMS, or e-mail, and/or remote storage 120 accessible over the mobile network infrastructure (i.e., basestation(s) 100, mobile network 110). The mobile network infrastructure is also communicable with the Internet 130 further providing access to other devices 140 for storing information pertaining to the customized and personalized settings of a mobile phone.

Figure 2:
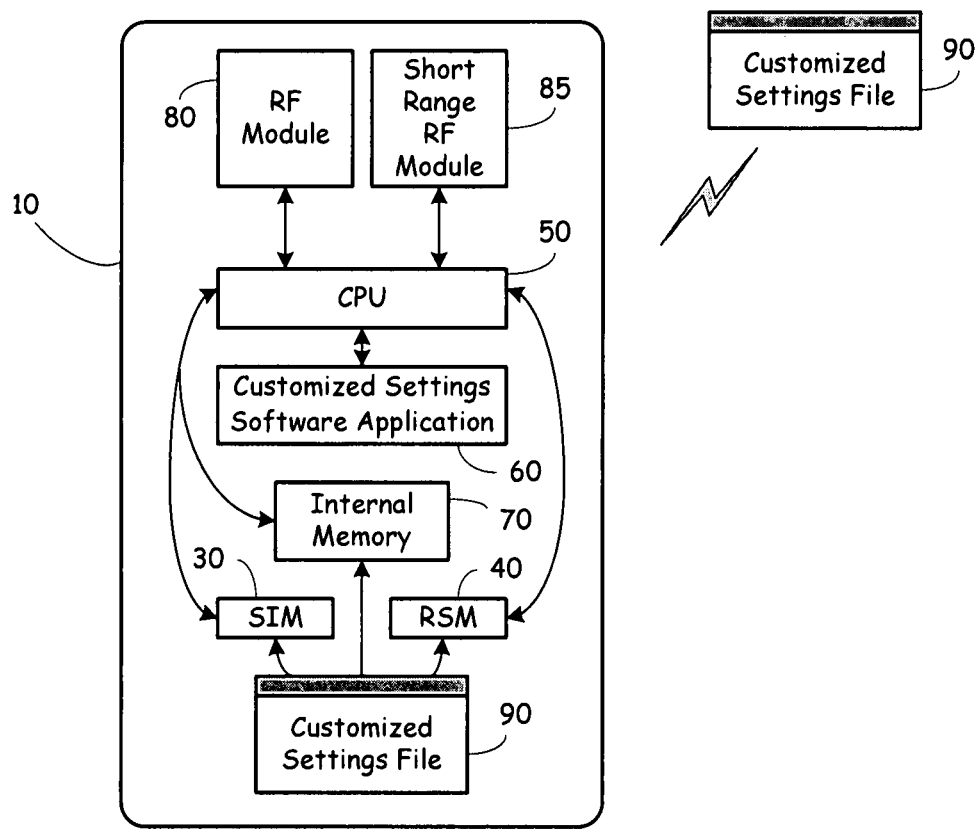
FIG. 2 is an illustration of some of the internal components of a mobile communications device.

FIG. 2 is an illustration of some of the internal components of a mobile communications device 10. To practice the embodiments of the present invention a mobile communications device 10 includes a processor 50, a customized settings software application 60, and one or more removable storage devices such as, but not limited to, a SIM card 30 and/or a removable storage media 40. The embodiments of the present invention can also utilize internal memory 70 and an RF module 80. A customized settings file 90 can be stored in one or more of the storage media 30, 40, 70 available to the mobile communications device 10.

The processor 50 interacts with and exerts control over the remaining components. The customized settings software application 60 maintains the customized settings file 90. It will update the file each time the user makes a change to one or more individual settings to ensure that the file is always current. Anytime a new customized settings file is detected—such as when a new SIM card containing such a file is inserted into a mobile communications device 10—it may prompt the user to act. The customized settings software application 60 can also cause the updated customized settings file 90 to be remotely stored on a storage device 120 associated with the mobile network 110, or on another storage device 140 accessible to the mobile network 110 via an interface to the Internet 130.

The customized settings file 90 can be sent and/or retrieved via the RF module 80 to/from a remote storage location. It can be sent directly as a file, it can be sent as part of an SMS, MMS, or email message as well.

The customized settings file 90 can also be sent and/or retrieved via the short range RF module 85 from another device. The short range RF module 85 can be one or more of, for instance, a Bluetooth™ module, a WiFi module, 802.11 module(s), that is communicable with another device capable of sending the customized settings file 90 to the mobile communications device 10.

In addition, the customized settings file can be stored as a hidden contact within a user's contact database with specific fields attributable to specific settings. A hidden contact setting has an added advantage of being independent from SIM design, architecture, and file structures. For instance, the "contact" could be given a "code name" upon storage that is only recognizable by the device, such that when it reads the SIM it does not display the existence of that contact to the user (but proceeds according to the method described). Alternately, the "contact" could be given a name that informs the user as to its purpose, and the application of the settings could be done upon the user navigating to and selecting the "contact."

Figure 3:
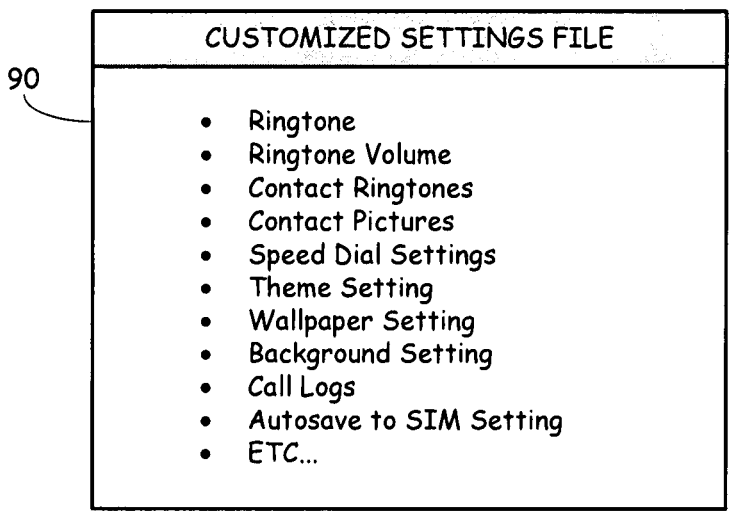
FIG. 3 is an example of a customized settings file for use with various embodiments of the present invention.

FIG. 3 is an example of a customized settings file 90 for use with various embodiments of the present invention. The customized settings file 90 can be formatted to be compatible with the data structure requirements of a particular hardware or software implementation. Some of the fields or data records that correspond to individual custom settings include ringtone, ringtone volume, individual contact ringtones, individual contact pictures, speed dial settings, theme setting, wallpaper setting, background setting, call logs, and autosave to SIM setting. The foregoing list is merely illustrative and is not meant to be all inclusive. There may be many more customized settings that have not been specifically enumerated above but nevertheless can be considered within the scope of and a part of the disclosure herein.

Figure 4:
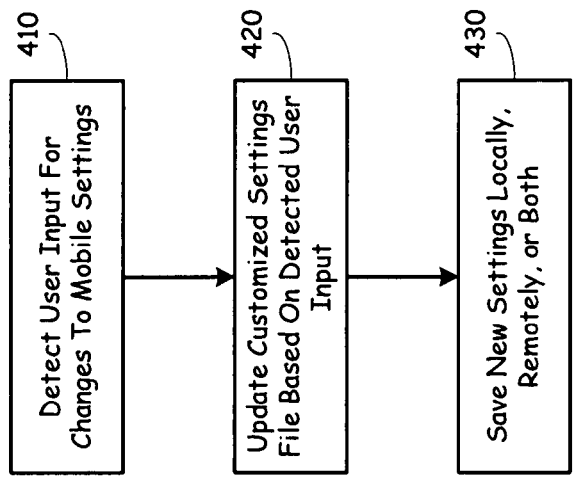
FIG. 4 is a flowchart for updating a customized settings file associated with a mobile communications device.

FIG. 4 is a flowchart for updating a customized settings file 90 associated with a mobile communications device 10. When a user uses a mobile communications device for the first time, she typically will spend some time configuring the mobile communications device with settings to her liking. Thereafter, the user is free to re-configure those settings at will. These customized settings can be captured and preserved in a customized settings file 90 so as to make them portable when the user decides to switch to a new mobile communications device. Each time a user adds, deletes or amends a customized setting, the customized settings software application 60 detects the addition/deletion/change 410 and updates the customized settings file 90 based on the detected user input 420. The new settings are then saved/stored locally (on the mobile communications device) or remotely (sent to a remote storage device) or both 430. If stored locally, the file can be stored in internal memory 70, on a SIM card 30, or on a removable storage media (RSM) 40. If stored remotely, the customized settings software application 60 can cause the mobile communications device 10 to send the changes or changed file to data storage 120 associated with the mobile network 110, or to a remote storage device/location 140 that is associated with the Internet 130 but communicable via the mobile network 110.

Figure 5:
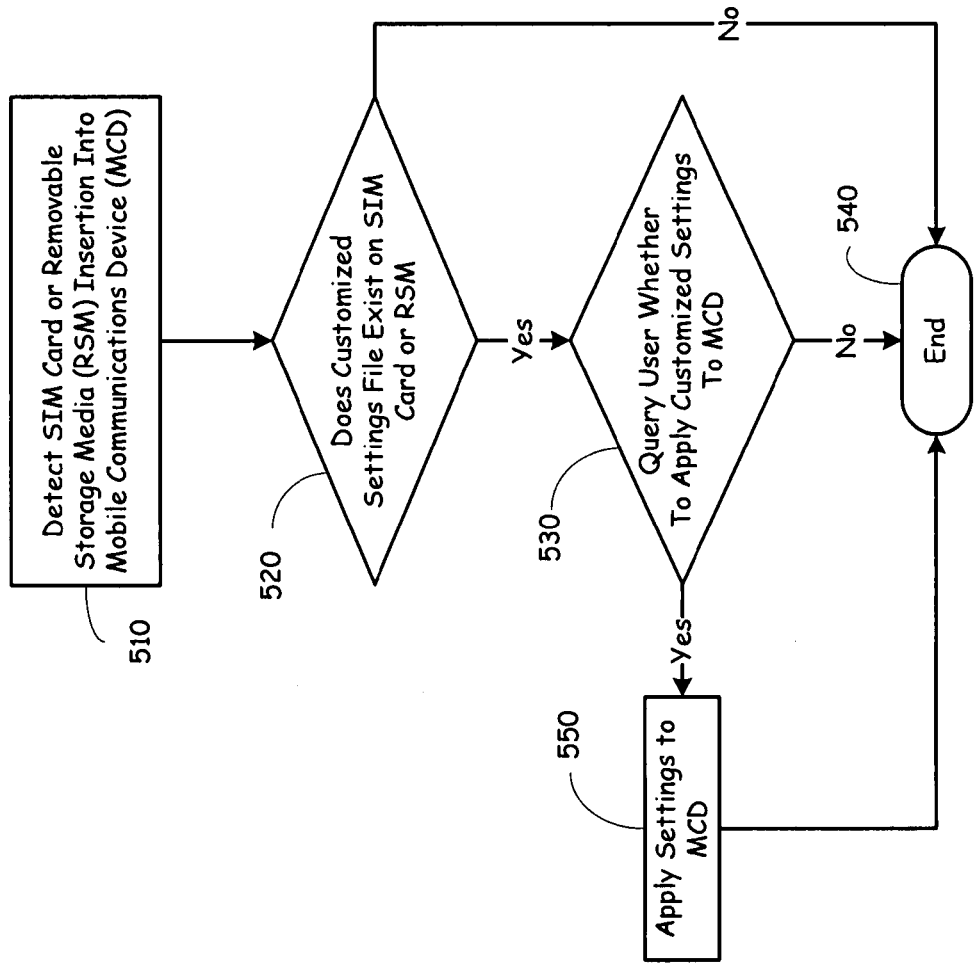
FIG. 5 is a flowchart for updating a second mobile communications device with the customized settings file from a first mobile communications device upon initial startup of the second mobile phone.

FIG. 5 is a flowchart for updating a second mobile communications device 20 with the customized settings file 90 from a first mobile communications device 10 upon initial startup of the second mobile communications device 20. This embodiment is directed toward using a SIM card 30 or other removable storage media 40 to facilitate customizing the second (new) mobile communications device 20 with the saved settings from the first mobile communications device 10.

Upon switching from one mobile communications device to another, the user will remove the SIM card 30 (if so equipped) and any other removable storage media 40 from the old device. One or both of the SIM card 30 and removable storage media 40 will then be inserted into the new device wherein such event will be detected by the new mobile communications device 510. The customized settings software application 60 then determines whether a customized settings file 90 exists on one of the SIM card or removable storage media 520. If a customized settings file 90 does not exist on any storage media inserted into the mobile communications device 20 then no further action is taken 540. If the customized settings software application 60 does detect a customized settings file 90 it causes the mobile communications device 20 to query or prompt the user whether to apply the detected customized settings file 90 to the new mobile communications device 530. If the user responds in the negative then no further action is taken 540 and the settings of the new mobile communications device 20 remain as they were. However, if the user responds affirmatively, the customized settings software application 60 will apply the customized settings file 90 to the new mobile communications device 550. The user now has their new device customized the way their old device was customized without having had to manually re-enter each setting.

Figure 6:
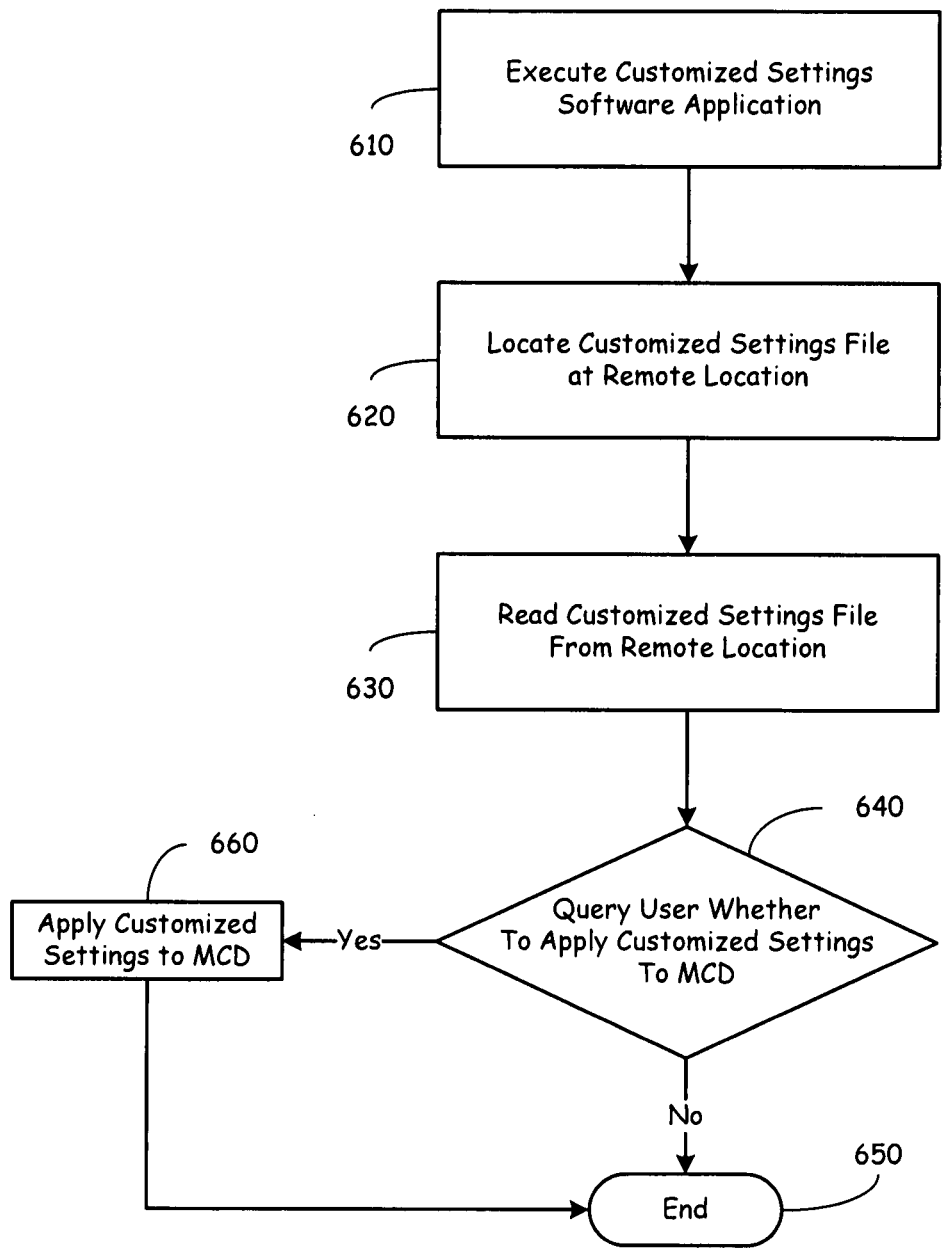
FIG. 6 is a flowchart for updating a mobile communications device with a customized settings file from a remote storage location.

FIG. 6 is a flowchart for updating a mobile communications device with a customized settings file from a remote storage location. In this embodiment, the user can access a customized settings file 90 that has been stored in a remote location. The remote location can include a data storage device/location 120 accessible to the mobile network 110. Or, the remote location can include a data storage device/location 140 accessible to the Internet 130 by way of the mobile network 110. The user can send/receive data to/from these remote locations in a variety of manners as well.

The user executes the customized settings software application 610. The customized settings software application 60 has either previously been provisioned with the remote location containing the customized settings file 90 or seeks user input as to its location. The customized settings software application 60 then locates 620 the customized settings file 90 at its remote location and reads the customized settings file 90 into local memory 630. The customized settings software application 60 then queries the user whether to apply the retrieved settings to the mobile communications device 640. If the user response is negative, no further action is taken 650. If the response is positive, then the settings just obtained are applied to the mobile communications device 660.

Figure 7:
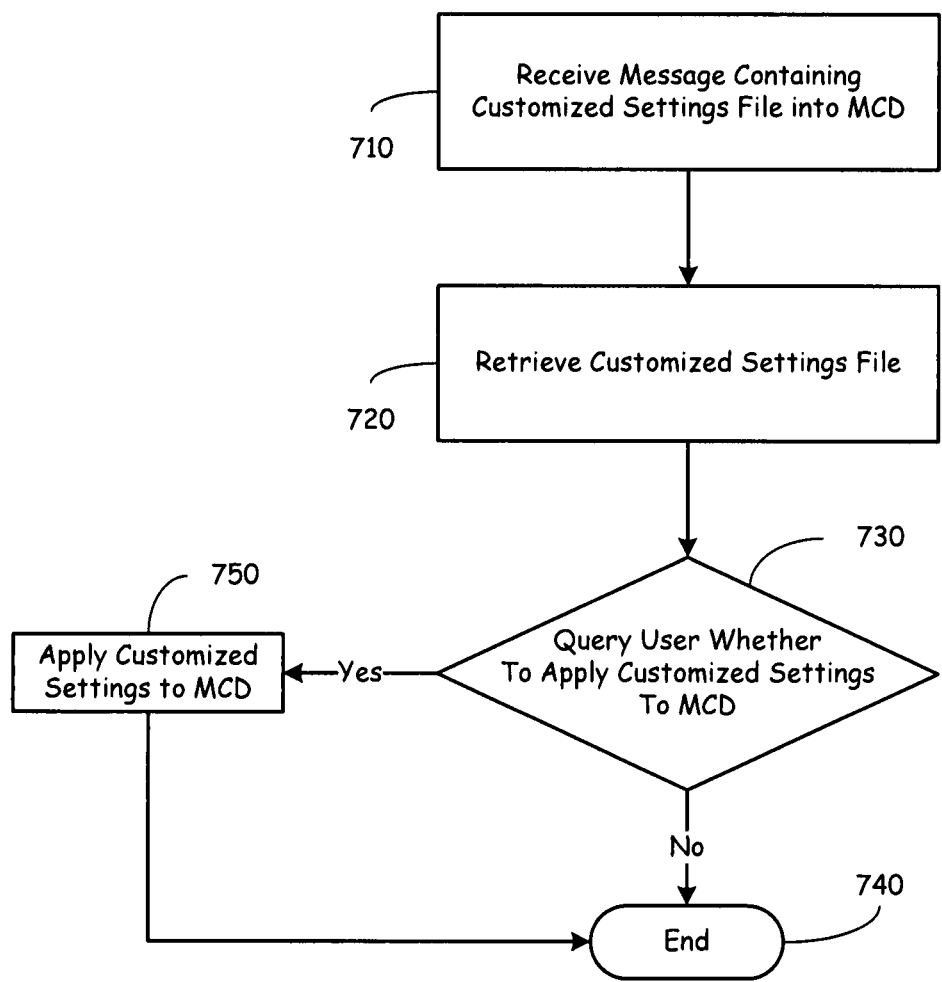
FIG. 7 is a flowchart for updating a mobile communications device with a customized settings file received as part of a message.

FIG. 7 is a flowchart for updating a mobile communications device with a customized settings file received as part of a message. The customized settings file 90 or changes to it can be included in an SMS or MMS message, or as an attachment to an e-mail message addressed to the mobile communications device.

The mobile communications device receives a message over a mobile messaging service such as, but not limited to, SMS, MMS or email that contains a customized settings file 710. The customized settings software application 60 then retrieves the customized settings file 720. The customized settings software application 60 then queries the user whether to apply the retrieved customized settings to the mobile communications device 730. If the user response is negative, no further action is taken 740. If the response is positive, then the settings just obtained are applied to the mobile communications device 750.

In all the embodiments described above, a user can switch mobile communications devices and always be able to 'set up' the new mobile communications device with the customized settings of the old mobile communications device without having to manually re-enter or re-key the data.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Any prompts associated with the present invention may be presented and responded to via a graphical user interface (GUI) presented on the display of the mobile communications device or the like.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A method, comprising:
   determining, by a mobile communications device, a location of a stored customized settings file,
   wherein the customized settings file is configured to include a plurality of fields that define at least one characteristic relating to a configuration of the mobile communications device,
   wherein the customized settings file is stored as a single entry within a contact database, the contact database also comprising a plurality of contact entries, each contact entry comprising a plurality of fields, each field corresponding to a characteristic of a contact associated with the contact entry,
   wherein the single entry is given a code name upon storage that is recognizable to the mobile communications device, the method further comprising:
   retrieving, by the mobile communications device, the customized settings file from the determined location in the contact database;
   querying, by the mobile communications device, subsequent to retrieving the customized settings file from the determined location in the contact database, the user to approve an application of the at least one characteristic, defined in the customized settings file, to the mobile communications device; and
   in response to the user approving the application, applying, by the mobile communications device, the at least one characteristic,
   wherein the customized settings file is located on a removable storage medium that is accessible to the mobile communications device,
   wherein the removable storage medium includes a subscriber identification module (SIM) card.

2. The method of claim 1, where the one or more characteristics, defined in the customized settings file, include one or more of:
   a ringtone setting,
   a ringtone volume setting,
   individual contact ringtone settings,
   individual contact picture settings,
   speed dial settings,
   a theme setting,
   a wallpaper display setting,
   a background display setting,
   call log settings, or
   an autosave to subscriber identification module (SIM) setting.

3. The method of claim 1, where the stored customized settings file is located at a remote location that is accessible to the mobile communications device.

4. The method of claim 3, where the remote location is accessible to the mobile communications device via a communications network.

5. A non-transitory computer readable medium storing a computer program product, the computer readable medium comprising:
   computer program code for determining a location of a stored customized settings file,
   wherein the customized settings file is configured to include a plurality of fields that define at least one characteristic relating to a configuration of a mobile communications device,
   wherein the customized settings file is stored as a single entry within a contact database, the contact database also comprising a plurality of contact entries, each contact entry comprising a plurality of fields each corresponding to a characteristic of a contact associated with the contact entry,
   wherein the single entry, when stored in the contact database, is given a code name upon storage that is recognizable by the mobile communications device, the computer readable medium further comprising:
   computer program code for retrieving the customized settings file from the determined location in the contact database;
   computer program code for querying the user, subsequent to retrieving the customized settings file from the determined location in the contact database, to approve applying the at least one characteristic, defined in the customized settings file, to the mobile communications device; and
   computer program code for applying, when the user approves applying the at least one characteristic, the at least one characteristic to the mobile communications device,
   wherein the stored customized settings file is located on a removable storage medium that is accessible to the mobile communications device, wherein the removable storage medium includes a subscriber identification module (SIM) card.

6. The computer readable medium of claim 5, where the one or more characteristics, defined in the customized settings file, include one or more of:
   a ringtone setting,
   a ringtone volume setting,
   individual contact ringtone settings,
   individual contact picture settings,
   speed dial settings,
   a theme setting,
   a wallpaper display setting,
   a background display setting,
   call log settings, or
   an autosave to subscriber identification module (SIM) setting.

7. The computer readable medium of claim 5, where the stored customized settings file is located at a remote location that is accessible to the mobile communications device via a communications network.

8. An apparatus, comprising:
   a radio frequency (RF) module; and
   a processor to:
   determine a location of a stored customized settings file, where the customized settings file is configured to include a plurality of fields that define at least one characteristic relating to a configuration of a mobile communications device, where the customized settings file is stored as a single entry within a contact database, the contact database also comprising a plurality of contact entries, each contact entry comprising a plurality of fields each corresponding to a characteristic of a contact associated with the contact entry, and where the single entry is given a code name upon storage that is recognizable to the mobile communications device;

retrieve the customized settings file from the determined location in the contact database;

query the user, subsequent to retrieving the customized settings file from the determined location in the contact database, to approve applying the at least one characteristic defined in the customized settings file; and when the user approves applying the at least one characteristic defined in the customized settings file, apply, to the mobile communications device, the at least one characteristic defined in the customized settings file, wherein the stored customized settings file is located on a removable storage media that is accessible to the mobile communications device, wherein the removable storage medium includes a subscriber identification module (SIM) card.

9. The apparatus of claim 8, where the one or more characteristics, defined in the customized settings file, include one or more of:
- a ringtone setting,
- a ringtone volume setting,
- individual contact ringtone settings,
- individual contact picture settings,
- speed dial settings,
- a theme setting,
- a wallpaper display setting,
- a background display setting,
- call log settings, or
- an autosave to subscriber identification module (SIM) setting.

10. The apparatus of claim 9, where the stored customized settings file is located at a remote location that is accessible to the mobile communications device via a communications network.

* * * * *